US006947836B2

(12) United States Patent
Ono et al.

(10) Patent No.: US 6,947,836 B2
(45) Date of Patent: Sep. 20, 2005

(54) NAVIGATION APPARATUS, FACILITY INFORMATION SEARCHING METHOD, PROGRAM THEREOF, AND A RECORDING MEDIUM WITH THE PROGRAM RECORDED THEREIN

(75) Inventors: Kouichi Ono, Kawagoe (JP); Kazuyoshi Kamiyama, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/443,981

(22) Filed: May 23, 2003

(65) Prior Publication Data

US 2003/0225510 A1 Dec. 4, 2003

(30) Foreign Application Priority Data

May 28, 2002 (JP) ........................................ 2002-154058

(51) Int. Cl.[7] ............................ G01C 21/00; G01S 5/00; G06F 17/00; G08G 1/00
(52) U.S. Cl. ........................ 701/207; 701/201; 701/202; 701/208; 701/209; 340/988; 340/995.1; 340/995.13; 340/995.19; 340/995.24
(58) Field of Search ................................ 701/201, 202, 701/207, 208, 209; 340/988, 995.1, 995.13, 995.19, 995.24; 705/5, 13, 14, 26

(56) References Cited

U.S. PATENT DOCUMENTS

| | | | |
|---|---|---|---|
| 5,021,961 A | * 6/1991 | Ross et al. ................... 701/200 |
| 5,229,947 A | * 7/1993 | Ross et al. ................... 701/200 |
| 5,648,768 A | * 7/1997 | Bouve ........................ 340/988 |
| 5,664,948 A | * 9/1997 | Dimitriadis et al. ..... 434/307 R |
| 5,911,773 A | * 6/1999 | Mutsuga et al. ............ 701/200 |
| 6,009,403 A | * 12/1999 | Sato .............................. 705/6 |
| 6,073,075 A | * 6/2000 | Kondou et al. ............. 701/203 |
| 6,308,177 B1 | 10/2001 | Israni et al. ................. 707/100 |
| 6,415,291 B2 | * 7/2002 | Bouve et al. ................. 707/10 |
| 6,427,118 B1 | * 7/2002 | Suzuki ....................... 701/209 |
| 6,434,482 B1 | * 8/2002 | Oshida et al. .............. 701/209 |
| 6,487,553 B1 | * 11/2002 | Emens et al. .................. 707/5 |
| 2002/0013658 A1 | 1/2002 | Tanaka et al. .............. 701/209 |

FOREIGN PATENT DOCUMENTS

| | | |
|---|---|---|
| EP | 0 767 358 A1 | 4/1997 |
| EP | 0 795 835 A1 | 9/1997 |
| EP | 1 043 567 A2 | 10/2000 |
| JP | 2001-21376 | 1/2001 |

* cited by examiner

*Primary Examiner*—Thomas G. Black
*Assistant Examiner*—Eric M. Gibson
(74) *Attorney, Agent, or Firm*—Armstrong, Kratz, Quintos, Hanson & Brooks, LLP.

(57) ABSTRACT

The input operation recognizing section 13 recognizes an input operation to execute re-search in the operating section 4. The facility search control section 10 makes the facility search section 9 execute re-search. The re-search by the facility search section 9 is carried out by searching, from facilities belonging to the same group as that of those detected in the previous search, facilities other than those detected in the previous search. With the present invention, when the re-search as described above is to be performed, user's operation for specifying a facility is not required, which improves the convenience in facility search.

14 Claims, 4 Drawing Sheets

NAVIGATION APPARATUS, FACILITY INFORMATION SEARCHING METHOD, PROGRAM THEREOF, AND A RECORDING MEDIUM WITH THE PROGRAM RECORDED THEREIN

BACKGROUND OF THE INVENTION

1. Field of the Invention

The present invention relates to a navigation apparatus based on facility information concerning facilities, method and a program thereof, and a recoding medium with the program recorded therein.

2. Description of Related Art

There has been popularized the navigation apparatus for vehicles, which is loaded on a vehicle as a movable body and allows for the user to search information concerning a running route to a destination by displaying the running route on a map.

This navigation apparatus has, in addition to the destination search function depending on names of facilities, telephone numbers, or addresses, the peripheral location search function allowing for the user to search a destination around a current position of the vehicle.

For instance, when a user wants to know a location of a gasoline station near from a current position of the user's vehicle with the peripheral location search function, the user selects the peripheral location search function, and specifies a category for search. After the category data is entered, the navigation apparatus displays a list for gasoline stations located in a peripheral area around a current position of the user's vehicle. When the user selects one of the gasoline stations shown on the list, the navigation apparatus set the selected gasoline station as the destination.

Then the navigation system automatically searches a recommended running route up to the destination set as described above from the vehicle's current position. Further the navigation apparatus displays, detecting a current position with a GPS receiver or the like, the route to the destination along the running route automatically searched and recommended as described above so that the user can drive on the running route.

For convenience of description, now a case is assumed, for instance, in which a user searches information on a facility in a peripheral area around a current position of the user's vehicle with the peripheral location search function as described above and drives the vehicle to the searched facility. When the user is required to find an alternative facility belonging to the same category as that of the selected facility for the selected facility is closed, the user is required to again input category data with the peripheral location search function, and selects a facility among those on the displayed list.

When the user is required to find and go to an alternative facility belonging to the same category as that of the facility selected first, it is also possible for the user to search an alternative facility by searching information concerning a name, a telephone number, an address, or other data of the facility. However, when the search as described above is to be performed, the user is required to input information such as the name, telephone number, address, or other types of data of the facility.

The navigation apparatus based on the prior art requires users to manually operate the apparatus, and there is the need to overcome this problem for further improved convenience.

SUMMARY OF THE INVENTION

The present invention was made to solve the problems as described above, and it is a main object of the present invention to provide a navigation apparatus allowing further improved convenience in facility search, a method and a program thereof, and a recording medium with the program recorded therein.

The navigation apparatus according to the present invention comprises a facility information fetching section for fetching facility information having at least group information concerning a plurality of groups categorized to facility types and positional information concerning locations of the facilities recorded therein; a facility search section for searching facility belonging to a specified group based on the facility information; and a control section for controlling the facility search section so that the user can easily search, when the user is required to find and go to an alternative facility belonging to the same category as that of the facility selected first, a facility other than that selected first.

With this feature, when the user is required to search an alternative facility belonging to the same category group as that searched previously, the user is not required to manually operate the navigation apparatus for identifying the facility, which insures further improved convenience in search of facilities.

The navigation apparatus according to the present invention further comprises a current position recognizing section for recognizing a current position of a moving body, and the control section preferably determines, when the user is required to search an alternative facility belonging to the same category group as that the user selected previously, based on the current position of the moving body as well as on the positional information included in the facility information whether the moving body is in the desired area where the facility selected previously exists or not, and when it is determined that the moving body is in the desired area, the control section controls the facility search section to search an alternative facility belonging to the same category group other than that previously selected.

Because of this feature, the control section can easily recognize whether the moving body is located at a position within the desired facility or not, and can again carry out the data search for the facility quickly and appropriately.

In the navigation apparatus according to the present invention, the facility information preferably includes accommodation space information concerning an accommodation space belonging to a facility available for accommodating moving bodies therein. The navigation apparatus according to the present invention further comprises a current position recognizing section allowing for recognition of a current position of a moving body, and the control section preferably controls the facility search section so that the search section determines, when the user is required to search an alternative facility, based on the current position of the moving body as well as on the accommodation space information included in the facility information, whether the moving body is within the accommodation space for the facility previously searched or not, and when it is determined that the moving body is within the accommodation of the facility previously searched, the search section searches an alternative facility other than that previously searched.

Because of this feature, the control section can quickly determines whether the moving body is now located within an area of the desired facility or not by checking whether the moving body is within the accommodation space for the facility or not, and also makes it possible for the user to again search the desired facility when it is determined that the moving body is not within the area of the desired facility.

In the navigation apparatus according to the present invention, the facility search section searches facilities within a specified area around the current position of the moving body, and preferably concentrically enlarges the specified area until at least one facility is detected.

Because of this feature, even in an area where there are only a few facilities belonging to the desired category group, at least one facility can be detected through a simple operation without fail by concentrically enlarging the specified area for searching. The navigation apparatus according to the present invention preferably comprises an input section for specifying execution of re-search by manual input operation, so that the control section makes the input section specify search facilities in an area around the current position when it recognizes that execution of re-search is specified, and further makes the search section again search the desired facility depending on the facility information obtained through the re-search in place of the facility information obtained through the previous search.

Because of this feature, user's operations for identifying a desired facility may be omitted, which allows the improved convenience in facility search.

The navigation apparatus according to the present invention preferably comprises an input section for specifying execution for re-search through by manual input operation, and a facility information recording section for recording therein information of the facilities searched by the facility search section, so that the control section makes the facility search section again search the facility information recorded on the facility information recording section as the facility obtained at previous search through recognizing the setting of the re-search execution by the input section.

Because of this feature, re-search for a desired facility can quickly be executed with the simple configuration by making the search section recognize facilities belonging to the same category group appropriately as that of the facilities obtained through the previous search.

In addition to the input setting function enabling identification of a facility to be searched with the input section, for instance, the input setting function for specifying execution of re-search by manual input operation may be provided, which allows for selectivity in facility search and further improved convenience.

The facility search method according to the present invention is one for searching facilities with a computing unit, and the computing unit searches facilities belonging to a desired group depending on the group information concerning a plurality of groups corresponding to a plurality of facility types respectively as well as on the facility information including at least positional information concerning positions of the facilities, and, when re-search is required, searches facilities other than those searched previously from the same group as that of the facilities previously searched.

Because of this feature, the same advantages as those provided by the facility search apparatus according to the present invention described above are provided.

In the facility search method according to the present invention, the computing unit preferably recognizes a current position of a moving body, determines, when re-search is required, whether the moving body is located within a desired area including the facilities obtained through the previous search depending on the recognized current position of the moving body as well as on the positional information included in the facility information, and searches facilities other than those previously searched when it is determined that the moving body is located within the specified area.

In the facility search method according to the present invention, the computing unit preferably recognizes a current position of the moving body, determines, when re-search is required, whether the moving body is located within an accommodation space for the facility obtained through the previous search depending on the recognized current position of the moving body as well as on the accommodation space information concerning an accommodation space belonging to each facility and capable of accommodating moving bodies therein, and searches facilities other than those searched previously when it is determined that the moving body is located within the accommodation space.

In the facility search method according to the present invention, when re-search is required, the computing unit preferably searches facilities within a desired area around the current position, and concentrically enlarges the specified area until at least one facility is detected.

In the facility search method according to the present invention, the computing unit preferably searches facilities in an area around the current position when it recognizes that setting of the re-search execution has been specified by manual input operation, and again searches a desired facility depending on the facility information obtained through the re-search in place of the facility information obtained through the previous search.

In the facility search method according to the present invention, the computing unit preferably records the facility information concerning the searched facilities, and, when it recognizes that setting of re-search execution has been specified by manual input operation, again searches a desired facility depending on the recorded facility information as the facility information obtained through the previous search.

With the configuration described above, the same advantages as those provided by the facility search apparatus according to the present invention described above are provided.

The facility search program according to the present invention makes the computing unit to execute the facility search method according to the present invention as described.

In the present invention, the facility search program is installed by making use of, for instance, a general-purpose computer as the computing unit. Because of this feature, the facility search method according to the present invention can be executed by the computing unit, which largely enhances the efficiency in use of the present invention.

The recording medium according to the present invention is one for recording therein the facility search program in which the facility search program according to the present invention described above is recorded so that the computing unit can read it for use.

In the present invention, as the facility search program for making the facility search method according to the present invention described above executed is recoded in the recording medium, the program can easily be handled, which largely enhances the efficiency in use of the present invention.

It is to be noted that the computing unit according to the present invention used for making the program executed or recorded in the recording medium includes, for instance, one unit of a personal computer, configuration in which a plurality of computers are linked to each other in the form of a network, chips such as an IC or a CPU for a microcomputer, and a circuit board or the like with a plurality of electric parts mounted thereon.

DETAILED DESCRIPTION OF PREFERRED EMBODIMENT(S)

An embodiment of the present invention is described below with reference to the drawings.

[Configuration of the Navigation Apparatus]

Figure 1:
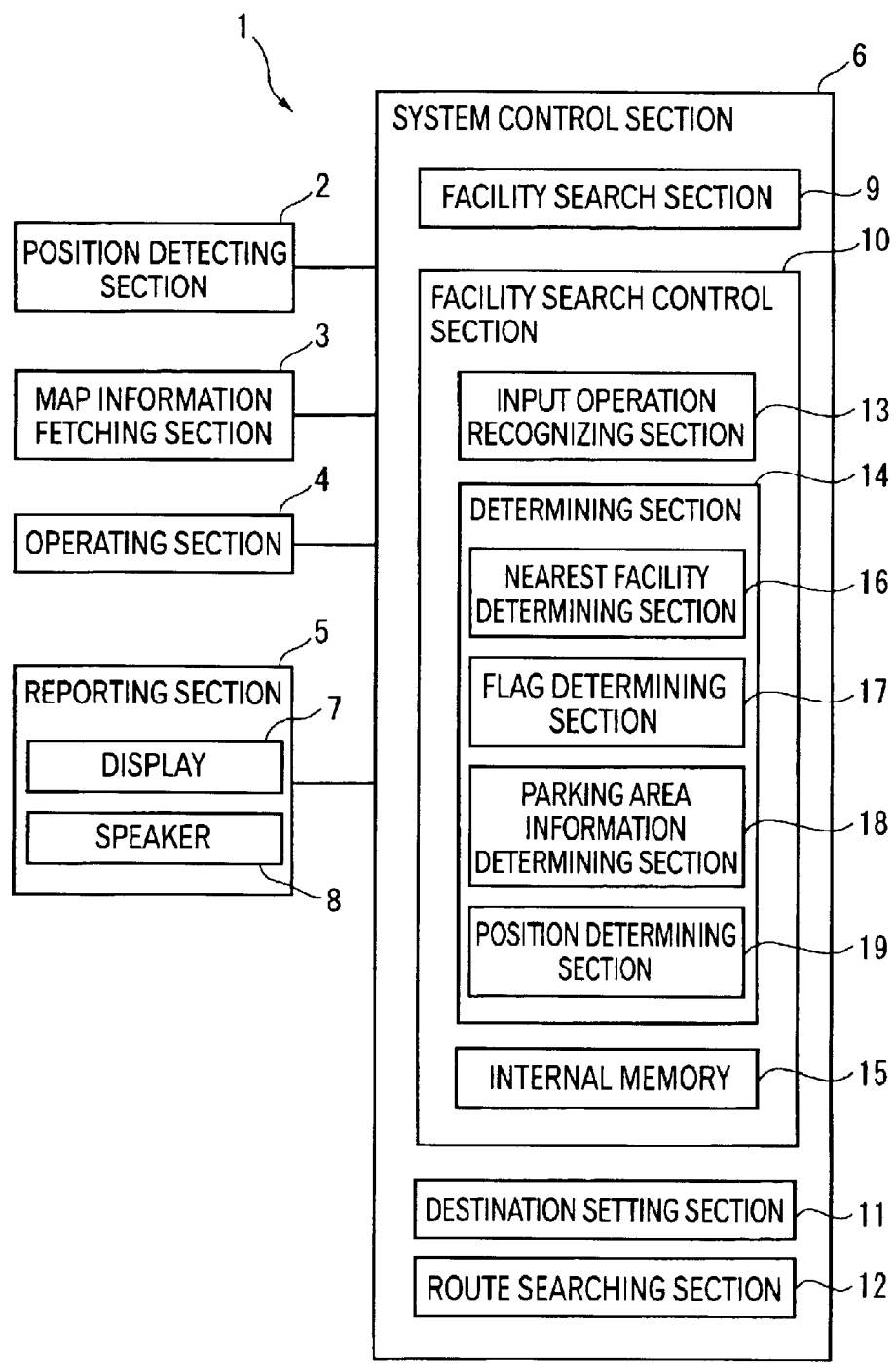
FIG. 1 is a view showing brief configuration of a navigation apparatus according to the present invention.

FIG. 1 is a block diagram showing brief configuration of the navigation apparatus according to the present invention. In FIG. 1, the reference numeral 1 indicates a navigation apparatus to be mounted on a vehicle as a moving body, and the navigation apparatus searches, for instance, a desired facility or a route to the desired facility. This navigation apparatus 1 comprises a position detecting section 2 as a current position recognizing section, a map information fetching section 3 as a facility information fetching section, an operating section 4 as an input section, a reporting section 5, and a system control section 6.

Connected to the position detecting section 2 are a GPS (Global Positioning System) receiving section, a speed sensor, an azimuthal angle sensor, and an acceleration sensor, each of these not shown herein. The position detecting section 2 fetches an output signal outputted from each of the system components described above.

Namely, the GPS receiving section detects information on an absolute position of a vehicle expressed by degrees of latitude and longitude information. The speed sensor is mounted on a vehicle and fetches speed information concerning a speed of a vehicle such as a pulse signal or a voltage value provides as an output value in association with rotation of an axle or a wheel of the vehicle. The azimuthal angle sensor is mounted on a vehicle and fetches information concerning an azimuthal angle of the vehicle, namely a direction in which the vehicle is running. The acceleration sensor detects information concerning acceleration in the direction in which the vehicle is running. The position detecting section 2 generates, based on the fetched information, positional data concerning a current position of the vehicle, speed data concerning the vehicle's speed, and mileage data concerning the mileage of the vehicle, and outputs the generated data to the system control section 6.

The map information fetching section 3 fetches the map information stored in a recording medium such as a CD-ROM (Compact Disk Read-Only Memory) or a DVD (Digital Video (or Versatile) Disk Read-Only Memory).

The map information includes, in addition to map data including road form data comprising cross-point data, road data and node data, and various types of data such as facility data for facility information concerning facilities such as stores or the like. For instance, the map data comprises a number of block data prepared by dividing the entire map into mesh-like unit areas and assigning a map file to each of the blocks.

Figure 2:
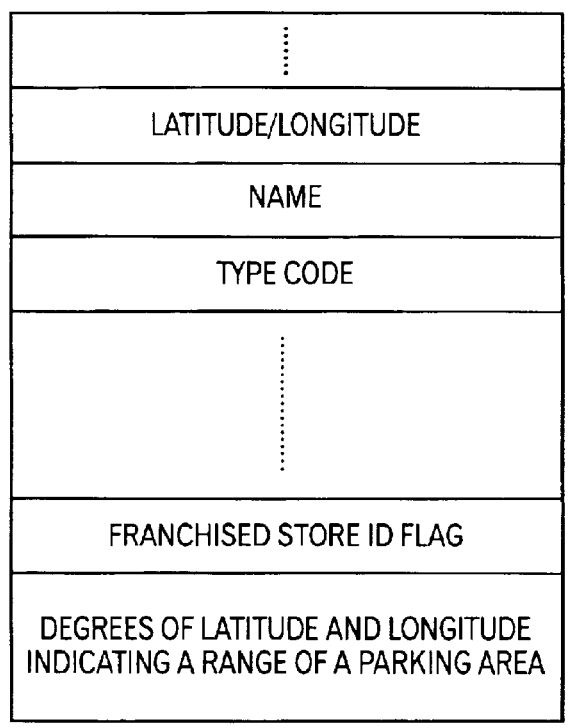
FIG. 2 is a view showing the data structure of facility data as facility information in the embodiment above.

FIG. 2 is a view showing data structure of facility data. As shown in FIG. 2, the facility data comprises such data as latitude/longitude information as positional information concerning positions of facilities, names of the facilities, type code identifying a type of each facility, chain-store ID flags each indicating whether a given facility is a member of a franchised store system or not, a range and a number of parking areas owned by each facility, and these various types of data are formed into a unit of record.

Of these data, the type code is information identifying respective facility, and also includes group information indicating a group of similar facilities and a category of the social function of each facility. For instance, facilities are divided to groups of franchising stores such as "xxx department stores" or "yyy gasoline stations" or the like. Further the facilities are divided to groups of social functions such as "department stores", "convenience stores", "gasoline stations" or the like. With the group information as described above, for instance, when several facilities form a franchising system, it is possible to search all of the facilities belonging to the franchising system.

The franchising store ID flag comprises, for instance, code of 0 and 1, and when the franchising store ID flag is 0 (zero), the facility does not belong to any franchising system. When the franchising store ID flag is 1 (One), the facility belongs to a franchising system.

Figure 3:
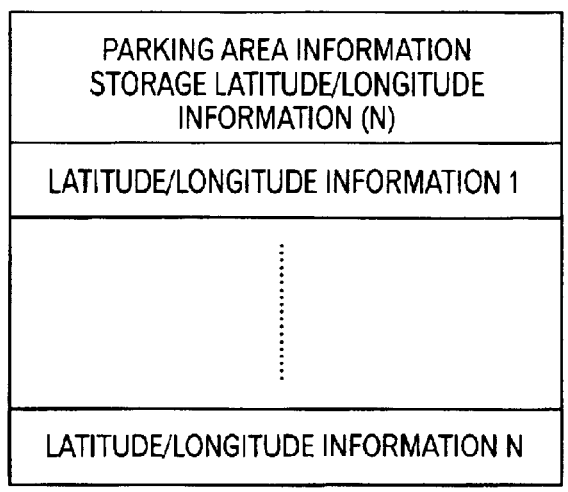
FIG. 3 is a view showing the data structure of parking area information in the embodiment above.

FIG. 3 is a view showing data structure of the parking area information. As shown in FIG. 3, the parking area information comprises a number (N) of storage latitude/longitude information indicating a number of parking areas that a facility owns, and latitude/longitude information N indicating a range of each discrete parking area owned by each facility compiled as a set of records.

For instance, assuming that a parking area is a square one, latitude/longitude information for each of the vertexes of the square may be stored as the latitude/longitude information N, and in that case an area surrounded by the vertexes indicated by the latitude/longitude information can be regarded as an area of the parking area.

The operating section 4 has, for instance, various types of operation buttons not shown herein for making the navigation apparatus 1 appropriately operate such as instructions for displaying a driving condition represents movement status of the vehicle.

For instance, a user inputs conditions for starting search for a desired facility such as a name, a telephone number, and an address of the facility and selects a category of a facility to be searched in an area around a current position of the user's vehicle on the menu display screen displayed on a display 7 of the reporting section 5 described hereinafter. When the user performs operations for data input by operating the operating buttons, the operating section 4 outputs a pre-specified operation signal to the system control section 6.

The operating mode of the operating section 4 is not limited to the input operation with the operation buttons, and for instance, the configuration is allowable in which various operating conditions are inputted from a touch panel or by means of voice input.

The reporting section 5 is controlled by the system control section 6, and reports a current position of a vehicle. This reporting section 5 comprises a display 7 and a speaker 8.

The display 7 is used for navigating operations, and the map data fetched by the map information fetching section 3 is displayed in various modes under instructions from the system control section 6, and also a current position of the vehicle is displayed in the superimposed state on the display 7. Further a preset menu display screen is displayed during the menu display for navigating operations.

Further in addition to the functions as described above, also TV image data received by a TV receiver not shown or image data stored in a recording medium such as an optical disk or a magnetic disk and read with a drive unit may be displayed thereon. More specifically, a liquid crystal panel or an organic EL (electroluminescence), a PDP (Plasma Display Panel), a CRT (Cathode-Ray Tube) or the like may be used as the display 7.

The speaker 8 outputs preset voice signals outputted from the system control section 6 to the outside. The voice signal includes a voice guidance for guiding a route for a vehicle.

The system control section 6 controls all of the operations of the navigation system 1. This system control section 6 comprises a CPU or the like, and reads out a control program stored in a ROM or the like not shown and executes the program. Further the system control section 6 outputs control signals to each component of the navigation system 1 and also inputs or outputs data. Although not in details on the figures, the system control section 6 comprises a CPU, a ROM, a RAM, an I/O device and a bus line connecting the components described above to each other. The system control section 6 comprises a facility search section 9, a facility search control section 10 as a control section, a destination selecting section 11, and a route search section 12.

The route search section 9 executes facility search in response to various control signals from the facility search control section 10. This facility search section 9 carries out alternative facility search comprising preparatory search for facilities near the current position of the vehicle and re-search for facilities belonging to the same group as that in the preparatory search but other than those detected in the preparatory search. Further the facility search section 9 carried out, in addition to the alternative facility search, particular facility search depending on a latitude and a longitude indicating a location, a name, a telephone number, an address or other parameters of the particular facility; related facility search depending on a genre to which the facility relates, or a keyword or the like relating to the facility to be searched; and peripheral search for searching facilities around a current position of the vehicle and belonging to a specified group of facilities. The facility data concerning the facilities detected in the searches above is stored in an internal memory 15 of a facility search control section 10 described below, and is also displayed in list as a menu display screen on the display 7 in response to the user's manual operation in the operating section 4.

Further the facility search section 9 searches facilities in a specified region around the current position of the vehicle when re-search is carried out in the alternative facility search. When a desired facility can not be found in this specified region, the facility search section 9 automatically and concentrically enlarges the specified region to repeatedly search the desired facility according to the program. It is to be noted that the facility search section 9 can enlarge the specific region concentrically until the desired facility is detected even when search other than the alternative facility search is being performed.

The facility search control section 10 recognizes an input operation in the operating section 4, and controls operations of the facility search section 9 in response to the recognized input operation. This facility search control section 10 comprises an input operation recognizing section 13, a determining section 14, and an internal memory 15 as a facility information recording section.

The input operation recognizing section 13 detects an operation signal generated in response to an input operation in the operating section 4, and recognizes input information from this operation signal. Then the input recognizing section 13 outputs a control signal corresponding to the input information to the facility search section 9.

The determining section 14 determines, based on a result of the alternative facility search by the facility search section 9, whether execution of re-search in the alternative facility search is allowable or not. This determining section 14 comprises a nearest facility determining section 16, a flag determining section 17, a parking area information determining section 18, and a position determining section 19.

The nearest facility determining section 16 fetches positional data for a current position of the vehicle detected by the position detecting section 2 and the latitude/longitude information for facility data concerning the facilities recorded in the internal memory 15 as a result of preparatory search by the facility search section 9. The nearest facility determining section 16 further identifies the nearest facility closest to the current position of the vehicle among the facilities recorded in the internal memory 15.

The flag determining means 17 reads and identifies a flag indicating whether the nearest facility identified by the nearest facility determining section 16 belongs to any franchising system or not from facility data for the facility. The flag determining section 17 determines whether the nearest facility belongs to a franchising system or not.

The parking area information determining section 18 reads out parking area information included in the facility data concerning the nearest facility identified by the nearest facility determining section 16, and determines whether the nearest facility owns a parking area or not. When it is determined that the nearest facility does not own any parking area, the parking area information determining section 18 makes an image corresponding to the nearest facility on the display 7 for alerting the user to determine whether the user wants to go to the facility or not.

The position determining section 19 fetches the positional data for a current position of the vehicle detected by the position detecting section 2 and the parking area information for the nearest facility identified by the nearest facility determining section 16. Then the position determining section 19 determines whether the vehicle is located within the parking area of the nearest facility or not.

When it is determined by the determining section 14 that the nearest facility satisfies the conditions the user hopes, the facility search control section 10 outputs a control signal to the facility search section 9. Then the facility search section 9 carries out re-search for other facilities other than the identified nearest facility from those belonging to the same group as that to which the identified nearest facility belongs.

The internal memory 15 stores therein facility data concerning the facilities searched by the facility search section 9. This internal memory 15 comprises, for instance, a rewritable RAM or the like.

The destination setting section 11 fetches facility data searched by the facility search section 9 and stored in the internal memory 15 of the facility search control section 10 to set a location of the destination. It is to be noted that the destination setting section 11 also sets the facility searched by the facility search section 9 and selected by the user by means of an input operation in the operating section 4 from the facilities displayed in a list form as a menu display screen on the display 7 as a destination.

The route search section 12 searches a recommended running route to the destination set by the destination setting section 11 from the positional data concerning the current position of the vehicle detected by the position detecting section 2. In this search for a recommended running route, roads on which the vehicle can run are searched from the map data fetched by the map information fetching section 3 or the like to select a route requiring a shorter period of time for arriving at the destination, a route with a shorter running distance, or a route evading the traffic jam or any specific traffic control.

[Facility Searching Method]

Figure 4:
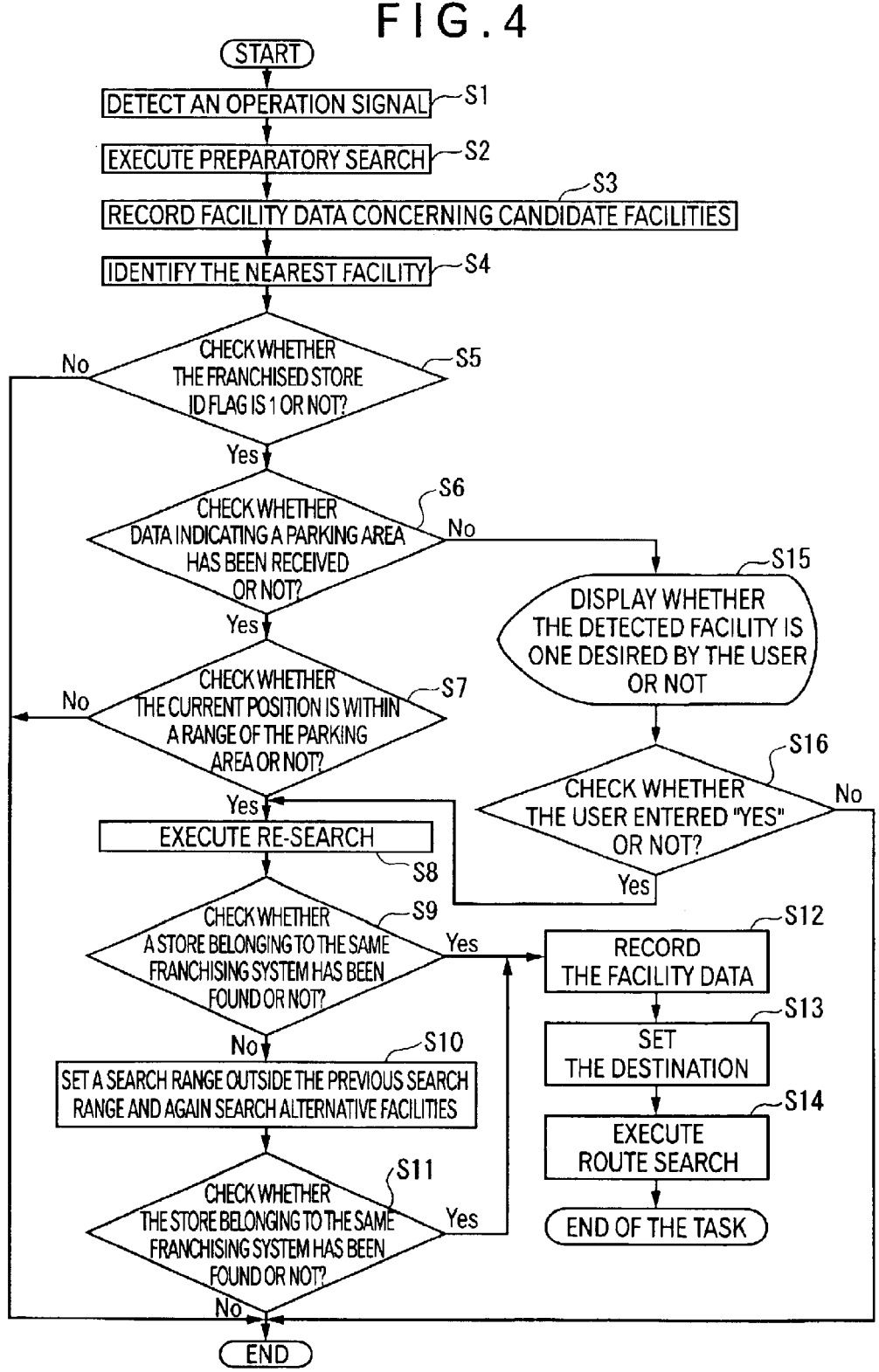
FIG. 4 is a flow chart showing a facility search method with the navigation apparatus according to the present invention.

FIG. 4 is a flow chart showing a facility searching method carried out by the navigation apparatus 1. The facility searching method carried out by the navigation apparatus 1 is described below with reference to the flow chart shown in FIG. 1 and FIG. 4. Herein the description is made especially with reference to the alternative facility search in the facility search section 9.

At first, as shown in FIG. 4, the input operation recognizing section 13 in the facility search control section 10 detects an operation signal outputted in response to pressing of the operation button of "Search for other facilities" in the operating section 4 by the user operation (step S1). Then the input operation recognizing section 13 recognizes the input information corresponding to the operation signal. The facility search control section 10 outputs a control signal to the facility search section 9 in response to the input information, and then alternative facility search is started by the facility search section 9.

After the step S1, the facility search section 9 fetches positional data for a current position of the vehicle detected by the position detecting section 2 and the facility data fetched by the map information fetching section 3 in response to the control signal from the facility search control section 10. Search (preparatory search) for facilities in an area around the current position of the vehicle is carried out based on the fetched data (step S2). More specifically, in this preparatory search, candidate facilities located near (within several hundred meters from) the vehicle's current position are extracted for all type codes in the facility data.

In step S2, facility data for the extracted candidate facilities is stored in the internal memory 15 of the facility search control section 10 (step S3).

The nearest facility determining section 16 in the determining section 14 fetches positional data concerning a current position of the vehicle detected by the position detecting section 2 and the latitude/longitude information included in the facility data for the candidate facilities stored in the internal memory 15 of the facility search control section 10. Then the nearest facility determining section 16 identifies the nearest facility closest to the vehicle's current position among the candidate facilities based on the data (step S4).

The flag determining section 17 determines, based on the franchised store ID flag included in the facility data for the nearest facility identified by the nearest facility determining section 16, whether the nearest facility belongs to any franchising system or not (step S5). More specifically, when the franchised store ID flag is 0 (zero), namely when it is determined that the nearest facility does not belong to any franchising system, the alternative facility search is terminated.

On the other hand, in step S5, when the franchised store ID flag is 1, namely when it is determined that the nearest facility belongs to a franchising system, the parking information determining section 18 fetches facility data for the nearest facility identified by the nearest facility determining section 16. Then the parking area determining section 18 determines, based on the parking area information included in the facility data, whether the nearest facility owns a parking area or not (step S6).

In step S6, when it is determined that the nearest facility owns a parking area, the position determining section 19 determines whether the vehicle's current position is within the parking area of the nearest facility or not (step S7). Namely, the position determining section 19 fetches the positional data concerning the vehicle's current position detected by the position detecting section 2 and the parking area information included in the facility data for the nearest facility identified by the nearest facility determining section 16. Then the position determining section 19 verifies the latitude/longitude information for the parking area to the latitude/longitude information for the vehicle's current position. When it is determined that the vehicle's current position is not within the parking area of the nearest facility, the alternative facility search is terminated.

On the other hand, when it is determined in step S7 that the vehicle's current position is within the parking area of the nearest facility, the facility search control section 10 outputs a control signal to the facility search section 9. Then the facility search section 9 recognizes the nearest facility as an identified facility, and again starts searching facilities other than the identified facility (re-search) from the facilities belonging to the same franchising system as that of the identified facility (step S8).

More specifically, when re-search is carried out, the facility search section 9 searches facilities in a specified area around the vehicle's current position based on the positional data concerning the vehicle's current position detected by the position detecting section 2, the facility data concerning the nearest facility identified by the nearest facility determining section 16, and the facility data fetched by the map information fetching section 3.

Then in step S8, when a store belonging to the desired franchising system is not detected as a result of re-search (step S9), the facility search section 9 sets a search area outside the specified area searched in step S8, and again executes search (step S10).

Figure 5:
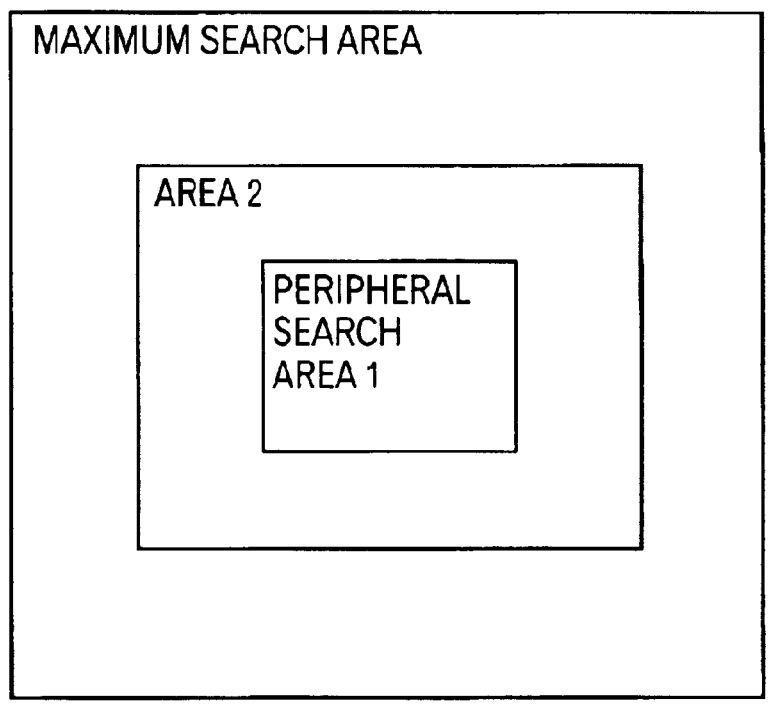
FIG. 5 is a view illustrating re-search method with a facility search section in the embodiment described above.

FIG. 5 is a view illustrating a searching method for re-search in the facility search section 9. As shown in FIG. 5, the facility search section 9 carries out facility search in an area 1 around the vehicle's current position in step S8. The area 1 is set, for instance, within an area with the radius of several kilometers from the vehicle's current position. Further, when a desired facility can not be detected within the area 1, the facility search section 9 sets an area 2 outside the area 1 and executes re-search in the area 2. As described above, the facility search section 9 concentrically enlarges the search range until the desired facility is detected. When the desired facility is not detected even by enlarging the search range to the maximum search area, the alternative facility search is terminated.

When franchised stores are detected as a result of re-search in step S8 or step S10 (step S9, step S11), of the detected facilities, the facility data concerning the facility nearest to the vehicle's current position is stored in the internal memory 15 of the facility search control section 10 (step S12).

Then the destination setting section 11 sets a destination based on the facility data stored in the internal memory 15 of the facility search control section 10 (step S13).

In step S13, when a destination is set, the route search section 12 searches a recommended running route to the destination from the vehicle's current position (step S14).

When it is determined in step S6 that the nearest facility does not own a parking area, the parking area information determining section 18 fetches facility data for the nearest facility identified by the nearest facility determining section 16. Then the parking area information determining section 18 makes a name or a logo mark of the nearest facility displayed on the display 7 so that the user can determine whether the nearest facility is the desired one or not (step S15).

The user determined on this display screen whether the nearest facility is the user's desired one or not, and manually operates the operating section 4 (step S16). When the user determines that the nearest facility is not the desired one, an operation signal outputted in response to pressing of the operation button indicating "NO" in the operating section 4 by the user is detected by the input operation recognizing section 13, and the alternative facility search is terminated.

On the other hand, when the user determines in step S16 that the nearest facility is the desired one, an operation signal outputted in response to pressing of the operation button indicating "YES" in the operating section 4 by the user is detected by the input operation recognizing section 13. Then the system control goes to step S8, and re-search by the facility search section 9 is started.

As described above, even when the nearest facility does not own a parking area, re-search can be carried out upon confirmation by the user.

[Effects Provided by the Embodiment]

In the navigation apparatus 1 described above, the input operation recognizing section 13 in the facility search control section 10 detects an operation signal indicating execution of the alternative facility search in response to an input operation in the operating section 4. Then the facility search control section 10 outputs a control signal to the facility search section 9 to make the facility search section 9 execute the alternative facility search. Therefore, when it is necessary to move to an alternative facility which belongs to the same group as that of the nearest facility now closest to the vehicle's current position, the user can again search the alternative facility without being required to manually operate the operating section 4 for execution of search for a particular facility, a related facility, and for those in the peripheral area, which insures the improved convenience in facility search.

The input operation recognizing section 13 detects an operation signal generated in response to an input operation by the user, and recognizes the input information in response to this operation signal. Then the facility search control section 10 outputs a control signal corresponding to the input information to the facility search section 9 to control operations of the facility search section 9. Therefore, the facility search control section 10 can control the facility search section 9 to respond to various input operations by the user.

The internal memory 15 of the facility search control section 10 stores therein facility data concerning the facilities searched by the facility search section 9. Then the determining section 14 determines a particular facility during execution of the alternative facility search based on the facility data stored in this internal memory 15. Because of this feature, the facility search section 9 can smoothly carry out the alternative facility search based on the facility data for the particular facility.

Further the determining section 14 identifies the nearest facility closest to the vehicle's current position based on the positional data concerning the vehicle's current position detected by the position detecting section 2 and the latitude/longitude information included in the facility data for candidate facilities obtained in the preparatory search by the facility search section 9. Further the determining section 14 determines whether the vehicle is located within a parking area of the nearest facility or not based on the parking area information included in the facility data for the identified nearest facility as well as on the positional data concerning the vehicle's current position detected by the position detecting section 2. When it is determined that the vehicle is within a parking area of the nearest facility, the facility search section executes re-search. Therefore, when the user wants to move to an alternative facility because, for instance, the nearest facility is closed, the user can quickly start re-search based on the recognition that the vehicle has arrived at the originally desired facility.

Further the determining section 14 determines, based on a franchised store ID flag included in the facility data for the identified nearest facility, whether the nearest facility belongs to a franchising system or not. When it is determined as a result of determination that the nearest facility does not belong to a franchising system, the alternative facility search can automatically be terminated, which allows quicker execution of facility search.

Further, when re-search in the alternative facility search is to be executed, the facility search section 9 searches facilities within a specified area around the vehicle's current position. When a desired facility is not detected within the specified area, the specified area is concentrically enlarged. Because of this feature, even in an area in which there are only a few stores belonging to a franchising system, the possibility to detect a desired facility becomes higher.

[Modifications of the Embodiment]

Although the present invention was described above with reference to preferred embodiment thereof, the present invention is not limited to these embodiments, and various improvements and design changes are possible without departing from the gist of the present invention.

Configuration of the navigation system 1 according to the embodiments above was described assuming a case where facility data as facility information is stored in a recording medium such as a DVD-ROM, or a CD-ROM, but the present invention is not limited to this configuration. For instance, the facility data may be stored in an external server and fetched therefore through radio communication. When the radio communication is utilized, the facility information fetching section corresponds to a radio unit incorporated in the navigation apparatus 1, or a mobile telephone connected to the navigation apparatus and capable of carrying out radio communications with an external server. Further the configuration is allowable in which a facility search function with the facility search section 9 and the facility search control section 10 is prepared, for instance, in the external server, and the facility search is executed with the external server or the like by means of radio communication.

In the navigation apparatus 1 according to the embodiments described above, for executing the alternative facility search by the facility search section 9, at first preparatory search for searching facilities near the vehicle's current position is carried out in response to an input operation by the user in the operating section 4 indicating the user's intention to execute the alternative facility search, and re-search is executed among the facilities searched in this preparatory search, but the present invention is not limited to this configuration. For instance, the configuration is allowable in which a destination is set by means of particular facility search, related facility search, or peripheral facility search each as destination search, and re-search is carried out by the facility search section 9 based on the destination set as described above. Further configuration of the alternative facility search may be changed by the user.

In the navigation apparatus according to the embodiments described above, the facility search section 9 continues search for facilities by enlarging the search range up to the maximum search area, and when a desired facility is not detected even within this maximum search area, facility search is terminated, and the present invention is not limited to this configuration. For instance, the configuration is allowable in which the search range is concentrically enlarged until a desired facility is detected.

In the embodiments above, in the alternative facility search by the facility search section 9, franchised stores including the nearest facility detected in the preparatory search are searched, but the present invention is not limited to this configuration. For instance, the configuration is allowable in which facilities are divided to various social genres such as "department stores", "convenience stores", or "gasoline stations" and facility search is executed within the same group. Further the configuration is allowable in which facility search is carried out for each franchising system or for each social genre according to the user's choice.

In the embodiments above, when the vehicle's current position is not within a parking area of the nearest facility, search for franchised stores as candidate facilities is not executed, but the present invention is not limited to this configuration. For instance, the configuration is allowable in which, when the vehicle's current position is not within a parking area of the nearest facility, an image corresponding to the nearest facility is displayed on the display 7 so that the nearest facility is the one desired by the user or not.

In the embodiments above, the navigation apparatus 1 is described, but the present invention is not limited to this configuration. For instance, the configuration is allowable in which software required for achieving the object of the present invention is installed in a computer.

In the embodiments above, the facility data is based on the data structure including latitude/longitude information indicating a geological position of each facility, a name, a type code, a franchised store ID flag of each facility, and parking area information, but the present invention is not limited to this configuration. Other types of data may be added, and also the facility data may be based on different data structure. In other words, any data structure is allowable so long as it is possible to search facilities belonging to a specified group.

In the embodiments described above, in the alternative facility search by the facility search section 9, the specified area is concentrically enlarged, but the present invention is not limited to this configuration. Any configuration is allowable so long as the specified area can be enlarged step by step.

In the embodiments above, the facility data concerning the facility searched by the facility search section 9 is stored in the internal memory 15 of the facility search control section 10, but the present invention is not limited to this configuration. Any configuration is allowable so long as the facilities detected in the previous search can be recognized in the alternative facility search by the facility search section 9.

In the embodiments above, description is made with reference to a vehicle as a moving body, but the present invention may be applied not only to a vehicle, but all types of moving bodies including an airplane or a vessel. The method of searching facilities with the navigation apparatus 1 is not limited to that shown in FIG. 4.

What is claimed is:

1. A navigation apparatus comprising:
   a facility information fetching section for retrieving facility information including group information concerning a plurality of groups of facilities, each group including a plurality of facilities belonging to a category and positional information concerning positions of said facilities;
   a facility search section for searching and retrieving facilities belonging to a specified group based on said retrieved facility information; and
   a control section for controlling said facility search section so that, when re-searches for facilities are carried out, said facility search section searches, from the same group of facilities as that searched in the previous search, facilities other than any facility previously selected from the previously retrieved facilities, wherein said control section determines whether a mobile body is within a specified area associated with any of the facilities retrieved in the previous search, and when it is determined that said mobile body is within said specified area, controls the facility search section so that the facility search section searches facilities other than the facility having the associated specified area in which said mobile body was determined to be within.

2. The navigation apparatus according to claim 1 further comprising:
   a current position recognizing section for recognizing a current position of a mobile body, wherein said control section determines, when re-searches for facilities are carried out, based on a current position of said mobile body and positional information included in the retrieved facility information, whether said mobile body is within a specified area associated with any of the facilities retrieved in the previous search.

3. The navigation apparatus according to claim 1, wherein the facility information includes accommodation space information relating to an accommodation space belonging to the facility and capable of accommodating a mobile body; said navigation apparatus further comprising:
   a current position recognizing section for recognizing a current position of the mobile body, wherein the control section determines, when re-searches for facilities are carried out, based on a current position of said mobile body and the accommodation space information included in said retrieved facility information, whether said mobile body is within an accommodation space associated with any of the facilities retrieved in the previous search, and, when it is determined that said mobile body is within any said accommodation space, controls the facility search section so that the facility search section searches facilities other than the facility having the associated accommodation space in which said mobile body was determined to be within.

4. The navigation apparatus according to claim 1, wherein the facility search section searches for facilities within a specified area around a current position of said mobile body and enlarges said specified area until at least one facility is detected.

5. The navigation apparatus according to claim 1 further comprising:
   an input section for specifying execution of a re-search by means of an input operation, wherein the control section makes the facility search section search facilities in an area around a current position of a mobile body when the control section recognizes that execution of the re-search has been specified by the input section, and further makes the facility search section again search, based on the facility information obtained in the previous search, facilities other than those retrieved in the previous search.

6. The navigation apparatus according to claim 1 further comprising:

an input section for specifying execution of a re-search by means of an input operation; and a facility information recording section for recording facility information concerning the facilities retrieved by the facility search section, wherein the control means makes the facility search section again search, based on the facility information recorded in said facility information recording section, facilities other than those retrieved in the previous search when the control section recognizes that execution of the re-search has been specified by said input section.

7. A facility searching method for searching facilities with a computing unit comprising the steps of:

searching facilities belonging to a specified group based on the group information concerning a plurality of groups of facilities, each group including a plurality of facilities belonging to a category, and positional information concerning positions of said facilities by the computing unit; and searching facilities other than those searched previously from the same group as that of the facilities retrieved in the previous search, when re-searches for facilities are carried out, wherein the computing unit determines whether a mobile body is within a specified area associated with any of the facilities retrieved in the previous search, and when it is determined that said mobile body is within said specified area, searches facilities other than the facility having the associated specified area in which said mobile body was determined to be within.

8. The facility searching method according to claim 7, wherein the computing unit recognizes a current position of the mobile body, and, when a re-search is to be performed, based on the current position of the mobile body recognized previously and the positional information included in the facility information, determines whether said mobile body is within a specified area associated with any of the facilities retrieved in the previous search.

9. The facility searching method according to claim 8, wherein the computing unit searches, when a re-search is to be performed, facilities located within a specified area around a current position of the mobile body, and concentrically enlarges said specified area until at least one facility is retrieved.

10. The facility searching method according to claim 8, wherein the computing unit searches, in an area around a current position of the mobile body, when the computing unit recognizes that execution of a re-search has been specified by means of input operation, and re-searches, based on the facility information obtained in the search, facilities other than those previously retrieved.

11. The facility searching method according to claim 7, wherein the computing unit recognizes a current position of said mobile body, and when a re-search is to be performed, based on the current position of the mobile body recognized previously and an accommodation space information concerning accommodation spaces associated with a facility and capable of accommodating mobile bodies therein, determines whether said mobile body is within an accommodation space associated with any of the facilities retrieved in the previous search, and, when it is determined that said mobile body is within any said accommodation space, searches facilities other than the facility having the associated accommodation space in which said mobile body was determined to be within.

12. The facility searching method according to claim 7, wherein the computing unit provides for recording the facility information concerning retrieved facilities, and, when it recognizes that execution of a re-search has been specified by means of an input operation, again searches facilities other than those searched previously, as determined with use of said recorded facility information.

13. A facility search program stored in a recording medium, for controlling the computing unit to execute the facility searching method according to claim 7.

14. The facility search program stored in the recording medium according to claim 13, wherein the facility search program is readable by the computing unit.

* * * * *